United States Patent [19]
Uemura et al.

[11] Patent Number: 5,928,419
[45] Date of Patent: Jul. 27, 1999

[54] SURFACE-TREATED ORGANIC PIGMENT AND PROCESS FOR THE PRODUCTION THEREOF

[75] Inventors: Toshiyuki Uemura; Tsukasa Iguchi; Sunao Satake; Hisashi Uraki; Yasuharu Iida, all of Tokyo, Japan

[73] Assignee: Toyo Ink Manufacturing Co., Ltd., Tokyo, Japan

[21] Appl. No.: 08/944,437

[22] Filed: Oct. 6, 1997

[30] Foreign Application Priority Data

| Oct. 7, 1996 | [JP] | Japan | 8-265717 |
| Oct. 7, 1996 | [JP] | Japan | 8-265718 |
| Oct. 7, 1996 | [JP] | Japan | 8-265719 |
| Oct. 9, 1996 | [JP] | Japan | 8-268618 |

[51] Int. Cl.$^6$ .................................... C09C 67/50
[52] U.S. Cl. ............... 106/493; 106/31.6; 106/31.65; 106/31.75; 106/410; 106/411; 106/495; 106/496; 106/497
[58] Field of Search ................ 106/493, 495, 106/496, 497, 410, 411, 31.6, 31.65, 31.75

[56] References Cited

U.S. PATENT DOCUMENTS

| 2,526,345 | 10/1950 | Giambalvo | 106/411 |
| 3,386,843 | 6/1968 | Jaffe et al. | 106/495 |
| 3,442,679 | 5/1969 | Framingham et al. | 106/473 |
| 3,749,590 | 7/1973 | Thomas et al. | 106/411 |
| 4,914,211 | 4/1990 | Jost et al. | 548/453 |
| 5,494,793 | 2/1996 | Schindele et al. | 435/6 |
| 5,618,343 | 4/1997 | Hendi et al. | 106/495 |
| 5,728,204 | 3/1998 | Sattar et al. | 106/411 |

FOREIGN PATENT DOCUMENTS

| 1031720 | 6/1953 | France . |
| 2128493 | 10/1972 | France . |
| 1619620 | 9/1969 | Germany . |
| 1569843 | 7/1970 | Germany . |
| 8-283596 | 10/1996 | Japan . |

OTHER PUBLICATIONS

Registry 5329–14–6, Sulfamic acid, Chemical Abstracts, Columbous Ohio, Dec. 1967.

CA 87:69817, "Sulfonation of copper phthalocyanine by sulfur trioxide or sulfur trioxide–base adducts", Shimura, T. et al. in Nippon Kagaku Kaishi (6) 847–51, Chemical Abstract, Columbus, Ohio, Dec. 1977.

CA 78:59765 "Sulfonation of copper–phthalocyanineand their separation", Shimura, T. et al. in Nippon Kagaku Kaishi (9) 1712–17, Chemical Abstract, Columbus, Ohio, Dec. 1972.

"Sulfonation and Sulfation" in vol. 23, Kirk–Othmer Encyclopedia of Chemical Technology, 4th ed., pp. 146–147, 150–154, Jun. 1997.

*Primary Examiner*—Mark L. Bell
*Assistant Examiner*—Scott L. Hertzog
*Attorney, Agent, or Firm*—Wenderoth, Lind & Ponack, L.L.P.

[57] ABSTRACT

A surface-treated organic pigment excellent in initial dispersibility and long-term dispersion stability in water and an organic solvent and free from the coagulation of pigment particles, obtained by reacting a sulfonating agent with an organic pigment dispersed in a solvent in which the organic pigment is insoluble or sparingly soluble, and thereby introducing a sulfonic acid group to the surface of each particle of the organic pigment.

12 Claims, No Drawings

SURFACE-TREATED ORGANIC PIGMENT AND PROCESS FOR THE PRODUCTION THEREOF

FIELD OF THE INVENTION

The present invention relates to a surface-treated organic pigment and a process for the production of thereof, and it further relates to a pigment dispersion containing the surface-treated organic pigment and an inkjet ink having an excellent dispersibility and excellent ejection stability in a nozzle.

BACKGROUND OF THE INVENTION

A pigment is generally insoluble in solvents such as an organic solvent and water. When a pigment as a colorant is used in an ink, a coating composition, plastics or a coloring image-forming material such as a liquid developer, it is often dispersed in an organic solvent or water as required for the particular use. Recently, in particular, it is strongly desired to form a water-based pigment in view of environmental problems or influences on human bodies, and a pigment is required to have stable dispersibility in water. For dispersing a pigment in water, conventionally, the pigment surface is modified with a surfactant, a dispersant or a dispersing resin to form a water-based ink or a water-based coating composition. However, most of organic pigments are lipophilic and have a problem that it is difficult to disperse them in water. That is, to maintain the dispersion state of a pigment in a water-based vehicle, a dispersant or a surfactant is selected for each pigment, dispersing conditions are modified, or pre-dispersing is required. Further, when a pigment is contained in an inkjet ink, often the dispersed ink coagulates in a nozzle portion, and it is difficult to re-disperse the coagulated ink. When a pigment is contained in a coating composition, for example, the problem is a phenomenon of pigment particles precipitating due to coagulation.

Attempts have been therefore made in various ways to improve a pigment in dispersion stability. One attempt, which has been already proposed, is an improvement in the method of imparting an organic pigment with hydrophilic nature. The hydrophilic nature is imparted by introducing a chemically hydrophilic group into each molecule of an organic pigment thereby to improve the organic pigment compatibility with a hydrophilic vehicle, so that the pigment is improved in dispersion stability.

However, when the number of the introduced hydrophilic groups is large, the above treatment converts an organic pigment to a water-soluble dye, and a phenomenon takes place wherein the ink transferred to a receptor sheet is poor in waterfastness and lightfastness. That is, there is a problem in the performance of the ink. Further, when the number of the introduced hydrophilic groups is small, the effect on the dispersion stability is extremely low. In the above method of introducing a hydrophilic group into each molecule of a pigment, it is difficult to control the introduction of the hydrophilic group, and it is very difficult to make the forming of a hydrophilic pigment and the fastness of an ink consist with each other.

On the other hand, various methods of chemically directly treating a pigment surface have been proposed. Among them is a method in which a pigment surface is treated with a fluorine gas (Kagaku, Vol. 46, No. 9, 1991).

It is disclosed that, in the above method, the surface of each particle is imparted with hydrophilic nature by ionizing the surface of each carbon surface with the fluorine gas whereby carbon having excellent dispersibility is obtained. However, the ionization of carbon particle surfaces causes a problem with the stability and performance when it is stored in a powder state, and another defect of the above method is that the carbon particles are unstable with regard to a pH of a dispersion and a change in temperature.

Further, there have been attempts to obtain a carbon black having excellent dispersibility in a water-based vehicle. That is, a sulfonic acid group is chemically introduced onto the surface of each carbon black particle to impart the carbon black with hydrophilic nature (Cabot Corporation: U.S. Pat. Nos. 3,442,679 and 3,519,452, Huber: U.S. Pat. No. 3,528, 840). For example, one of the above attempts is directed to a treatment method in which carbon black is reacted with fuming sulfuric acid to sulfonate the carbon black surface. When this treatment method is applied to an organic pigment, the organic pigment is dissolved or violently decomposed because of the fuming sulfuric acid. Even when the sulfonation takes place, it takes place on a molecular level and rarely takes place on the surface, so that the treatment effect differs between carbon black and an organic pigment. Further, since the sulfonation entails a morphological change such as crystal transition or crystal growth, the surface reaction cannot be controlled, and the sulfonation therefore cannot be applied to an organic pigment. In another attempt, ammonium sulfate or ammonium sulfite is mixed with carbon black and the mixture is heated to decompose the ammonium compound and to eliminate ammonia gas so that the carbon surface is sulfonated. When this treatment is applied to an organic pigment, the oxidation treatment at a high temperature entails violent decomposition, the reaction proceeds non-uniformly, and the reaction efficiency is poor. The above treatment therefore cannot be applied to an organic pigment.

In addition to the above methods, treatments in a gaseous phase such as ozone treatment and plasma treatment are being studied. With regard to the plasma treatment, studies are under way using an inert gas such as He or Ar or a reactive gas such as $H_2$, $O_2$, $N_2$, CO, $CO_2$, $H_2O$ or $CF_4$. Of these, the use of low-temperature oxygen plasma treatment (IHARA Tatsuhiko: Shikizai (Coloring Materials), 54,531, 1981) and the treatment with ammonia plasma (S. IKEDA: J. Coat. Technol., 60,765, 1988) are proposed as treatments having effects on organic pigments. The treatment with oxygen plasma cannot be used for some pigments due to a color change caused by oxidation, and the treatment with ammonia plasma is employed for improving the dispersibility and the weatherability. These plasma treatments are advantageous in dry treatment, while they are not always sufficient concerning the uniformity in treatment and an effect on dispersibility. None of these are practically used.

As discussed above, chemical treatments of organic pigments have been attempted in various ways, while there has been found no treatment method which has a practical effect on the dispersibility in a water-based vehicle.

A variety of methods for producing pigment dispersions have been proposed. In most of the methods, a surfactant, a dispersant, a dispersing resin or a pigment derivative is used, and a dispersing machine or a milling machine is used the combination of ingredients. These methods are advantageous in that pigments dispersions can be relatively easily produced, while it is required to change a surfactant, a dispersant or a pigment derivative depending upon the kind of a pigment. Further, for some uses, there are many points to be noted, such as compatibility and a mutual effect between a resin and a dispersant, and a decrease in the dispersibility of a pigment in a solvent caused by dissolving a surfactant or a dispersing resin. The above methods therefore have problems which remain to be solved for producing compositions such as an ink, a coating composition, etc.

On the other hand, concerning chemically surface-treated pigments, a surface-treated carbon black is practically used for dyeing a skin and leather or in an inkjet ink. However, when an organic pigment is treated only by a conventional method such as plasma treatment, it is difficult to maintain the dispersion stability of the organic pigment, and almost in no case, a pigment dispersion has been produced without an aid such as a surfactant, a dispersant or a dispersing resin.

An inkjet recording liquid prepared by dissolving a water-soluble dye such as an acidic dye, a direct dye or a basic dye in a glycol-containing solvent and water is often used as is disclosed in JP-A-53-61412, JP-A-54-89811 and JP-A-55-65269. The water-soluble dye is generally selected from those having a high solubility in water for attaining the stability of the recording liquid. As a result, there is a problem that an inkjet printing (recorded product) has poor waterfastness so that a dye of a record portion feathers when water is spilled on it.

For overcoming the above poor waterfastness, attempts have been made to alter the structure of a dye or to prepare a recording liquid having a high basicity, as is disclosed in JP-A-56-57862. Further, attempts have been made to utilize a reaction between a receptor sheet and a recording liquid, as is disclosed in JP-A-50-49004, JP-A-57-36692, JP-A-59-20696 and JP-A-59-146889.

The above methods have remarkable effects when specific recording sheets are used, while these methods are limited to specific recording sheets and are therefore insufficient as a method applicable to general sheets. When a recording sheet other than the specific sheets is used, a recording liquid containing a water-soluble dye often fails to give a recorded product having sufficient waterfastness.

As a recording liquid having excellent waterfastness, there is a recording liquid obtained by dissolving or dispersing an oil-soluble dye in a solvent having a high boiling point or a recording liquid obtained by dissolving an oil-soluble dye in a volatile solvent. However, these recording liquids have problems concerning the odor and disposal of the solvents and are environmentally undesirable. Further, when a large volume of recorded products are made, the problem is that it is required to recover or recycle the solvent as required depending upon a place where a printing machine is installed.

For improving a recorded product in waterfastness, it is therefore under way to develop a recording liquid which is a dispersion of a pigment in a water-based system.

However, unlike a dye, it is very difficult to disperse a pigment in the form of fine particles and maintain the dispersion of a pigment in a stable state. On the other hand, with an increase in the resolution of a printer for use with an inkjet recording liquid, the diameter of a nozzle of the printer decreases. It is therefore required to decrease the diameter of a pigment so as to form fine particles. In image-forming on a transparent substrate of an overhead projector, etc., it is required to attain transparency equivalent to that of dye, and a pigment is also required to be finely milled in view of the color development of the pigment.

SUMMARY OF THE INVENTION

It is an object of the present invention to provide an organic pigment which is excellent in initial dispersibility and long-term dispersion stability in water and an organic solvent and which is free from the coagulation of pigment particles, and a process for the production thereof.

It is another object of the present invention to provide a water-based dispersion of the above pigment having dispersion stability.

It is further another object of the present invention to provide a water-based inkjet recording liquid which has dispersion stability and has excellent ejection stability in a nozzle.

According to the present invention, there is provided a surface-treated organic pigment which substantially has no sulfonic acid group inside each particle thereof and has a sulfonic acid group only on the surface of each particle thereof.

According to the present invention, there is also provided a process for the production of a surface-treated organic pigment, which comprises reacting a sulfonating agent with an organic pigment dispersed in a solvent in which the organic pigment is insoluble or sparingly soluble, and thereby introducing a sulfonic acid group to the surface of each particle of the organic pigment.

According to the present invention, there is further provided a dispersion of a surface-treated organic pigment, obtained by dispersing the above surface-treated organic pigment in a water-based liquid.

According to the present invention, there is also provided a method of use of the above dispersion of a surface-treated organic pigment as an inkjet recording liquid.

DETAILED DESCRIPTION OF THE INVENTION

The present inventors have made diligent studies and have arrived at the present invention by finding the following. A surface-treated organic pigment obtained by dispersing an organic pigment in a solvent in which the organic pigment is insoluble or sparingly soluble and then introducing a sulfonic acid group to the surface of each particle of the organic pigment with a sulfonating agent exhibits improved dispersibility in water and an organic solvent since. The surface-treated organic pigment is imparted with hydrophilicity.

That is, the surface-treated organic pigment (to be sometimes referred to as "surface-treated pigment" hereinafter) of the present invention is an organic pigment which substantially has no sulfonic acid group inside each particle thereof and has a sulfonic acid group only on the surface of each particle thereof. Further, the process for the production of a surface-treated pigment, provided by the present invention, is a process which comprises dissolving an organic pigment in a solvent in which the organic pigment is insoluble or sparingly soluble, and introducing a sulfonic acid group to the surface of each particle of the above organic pigment with a sulfonating agent. Further, in the process for the production of a surface-treated pigment, the surface of each particle of an organic pigment can be uniformly treated by finely milling the pigment with a milling machine or a dispersing machine before or during the surface treatment, by employing a water-wetted pigment paste free of dry coagulation as an organic pigment or by using an organic pigment of which the crystallinity or particle diameter is controlled by salt milling or solvent milling.

When the above surface-treated pigment is used, a pigment dispersion having dispersion stability can be obtained without using a surfactant or a dispersing resin. Further, it has been found that a water-based dispersion of the above surface-treated pigment can give a water-based inkjet recording liquid having stable dispersibility and having excellent ejection stability in a nozzle. The surface-treated pigment obtained by treating the surface of an organic pigment with a sulfonating agent is improved in dispersibility in water and can be milled to form fine particles owing to the function of a sulfonic acid group.

The organic pigment used in the present invention may be in any one of the state of a powder after it is dried and the state of a pigment paste obtained by the production proess of the organic pigment. Examples of the organic pigment in the latter state will be specifically described below.

Generally, after the completion of a synthesis reaction of an organic pigment, a reaction mixture is washed and purified with water, and after it is in a state wetted with water, it is filtered, dried and milled to form an organic pigment in the form of a powder. Since, however, the drying is carried out after the filtering, particles of the pigment strongly coagulate with one another, and it is difficult to finely mill the coagulated particles to primary particles. When strongly coagulated pigment particles are surface-treated, the surface treatment hardly has a modification effect on the surface of each primary particle in some cases. When the fine particles almost similar to primary particles are surface-modified, it is effective to surface-treat the pigment before the strong coagulation takes place. That is, it has been found that it is remarkably effective for dispersing a pigment in water-based system to surface-treat a water-wetted pigment paste before the reaction mixture is not dried in the step of forming a pigment. When a water-wetted pigment paste is used for a sulfonation reaction in a solvent, a sulfonating agent is hydrolyzed due to the presence of water so that the sulfonation effect extremely decreases in many cases, and the rate of introduction of a sulfone group decreases so that the modification effect is not much expected in many cases. However, a solvent used in the reaction system replaces water present on the pigment surface by mixing or by stirring and kneading, and replaced water is removed by reducing a pressure or heating, whereby the pigment particles are uniformly surface-treated without coagulating the pigment particles.

Further, as a water-wetted organic pigment paste, a pigment paste obtained by a milling treatment such as salt milling or solvent milling can be also used. In the field where particularly finely milled pigment particles are required, the modification effect can be enhanced by carrying out the surface treatment of a water-wetted paste according to the present invention after salt milling without drying the paste. The term "salt milling" generally refers to the treatment of finely milling a pigment by milling a milled sodium chloride salt and a pigment in diethylene glycol. The term "solvent milling" refers to a treatment method in which an organic pigment is milled in a specific solvent so that the crystal growth of pigment particles is prevented to form pigment particles having a uniform particle diameter or in which pigment particles are controlled to have a desired crystallinity by utilizing crystal transition caused by a solvent.

The organic pigment used for the surface-treated pigment of the present invention, and the organic pigment used in the process for the production of a surface-treated pigment, provided by the present invention, are not specially limited. Examples of the organic pigment include insoluble azo pigments such as Toluidine Red, Toluidine Maroon, Hansa Yellow, Benzidine Yellow and Pyrazolone Red, soluble azo pigments such as Lithol Red, Helio Bordeaux, Pigment Scarlet and Permanent Red, vat dyes such as Alizarin, Indanthrone and Thioindigo Maroon, phthalocyanine pigments such as Phthalocyanine Blue, quinacridone pigments such as Quinacridone Red and Quinacridone Magenta, perylene pigments such as Perylene Red and Perylene Scarlet, isoindolinone pigments such as Isoindolinone Yellow and Isoindolinone orange, pyranthrone pigments such as Pyranthrone Red and Pyranthrone Orange, indigo pigments, thioindigo pigments, fused azo pigments, benzimidazolone pigments, flavanthrone pigments such as Flavanthrone Yellow, perinone pigments such as Perinone Orange, diketopyrrolopyrrole pigments, Anthrone Orange, anthanthrone pigments, nitro pigments, nitroso pigments, anthraquinone pigments such as Dianthraquinolyl Red, quinophthalone pigments such as Quinophthalone Yellow, indanthrone pigments, dioxazine pigments such as Dioxazine Violet, Acylamide Yellow, Nickel Azo Yellow, and Copper Azomethine Yellow.

In view of lightfastness, it is preferred to use at least one organic pigment selected from the group consisting of quinacridone pigments, phthalocyanine pigments, benzimidazolone pigments, isoindolinone pigments, quinophthalone pigments and diketopyrrolopyrrole pigments. The particle diameter range of the pigment used in the present invention is the same as the range of the particle diameter of a pigment generally used in an ink or a coating composition, while the particle diameter of the pigment is preferably 50 to 0.01 $\mu$m, more preferably 10 to 0.05 $\mu$m. When used in an inkjet recording liquid, it is preferred to use an organic pigment having an average particle diameter of 10 to 150 nm (measured by a laser scattering method).

In the present invention, the organic pigment can be surface-treated by the sulfonation that can be carried out in general organic reactions so long as there is selected a solvent which does not react with a sulfonating agent and which is insoluble or sparingly soluble in the organic pigment. The sulfonating agent can be selected from sulfuric acid, fuming sulfuric acid, sulfur trioxide, chlorosulfuric acid and sulfamic acid acid. When sulfur trioxide is too highly reactive or when the presence of a strong acid is undesirable, the sulfonation can be carried in the presence of a complex of sulfur trioxide with a compound such as a tertiary amine (Shin-Jikken Kagaku Koza, Vol. 14, Item No. 1773, issued by Maruzen). The compound which is used as a solvent as well as a agent for forming a complex with sulfur trioxide and can be used for the sulfonation of the pigment surface includes, for example, basic solvents such as N,N-dimethylformamide, pyridine, triethylamine and trimethylamine, and solvents such as dioxane, nitromethane and acetonitrile. These solvents may be used alone or in combination. Further, other solvent may be used in combination with the above solvent so long as the organic pigment is insoluble or sparingly soluble in it and so long as it is not reactive with sulfur trioxide as a sulfonating agent. Examples of the "other solvent" include sulfolane, N-methyl-2-pyrrolidone, dimethylacetamide, quinoline, hexamethylphosphoric triamide, chloroform, dichloroethane, tetrachloroethane, tetrachloroethylene, dichloromethane, nitromethane, nitrobenzene, liquid sulfur dioxide, carbon disulfide and trichlorofluoromethane. The amount of the solvent is preferably 3 to 200 times as large as the weight of the organic pigment for excellently treating the organic pigment with the sulfonating agent by maintaining the wetness of the organic pigment with the solvent and the loose state of the organic pigment. When the amount of the solvent is smaller than 3 times the weight of the organic pigment, the organic pigment may be treated in a coagulated state with high possibility, and it is difficult to obtain fine particles. When the above amount is greater than 200 times the weight of the organic pigment, the reactivity of the sulfonating agent is poor, or the removal of the solvent and the purification of the organic pigment are a burden on a subsequent step and the step of recovery of the pigment is troublesome. Further, uneconomically, the amount of the organic pigment that can be treated is decreased.

Further, when a strong acid such as sulfuric acid, fuming sulfuric acid, chlorosulfuric acid or fluorosulfuric as a sulfonating agent acid is used alone, the pigment is decomposed or is dissolved therein, and no desired reaction is performed. When molecules react individually like a general organic reaction, it is necessary to take care of the kind and the amount of the solvent for inhibiting the reaction. The solvent can be selected from the above-described solvents so long as they do not react with the sulfonating agent.

However, in some cases, the reaction takes place on the pigment surface, but proceeds entailing a crystal transition or crystal growth depending upon reaction conditions and the kind and the crystal form of a pigment. In such cases, the pigment surface is imparted with hydrophilicity, while the specific surface area of the pigment decreases and the particle diameter thereof grows, so that it is difficult to obtain a pigment having excellent dispersibility. For example, when an unstable crystal of a pigment is heated in a solvent, the pigment is liable to undergo crystal transition. Further, a stable crystal of a pigment undergoes crystal growth when heated in an aromatic solvent, and it is difficult to obtain a surface-treated pigment which satisfies the object of excellent dispersibility in a water-based system. Since the reaction conditions differ depending upon the kind and the crystal form of the pigment, the reaction temperature, the reaction time and the kind and selection of the sulfonating agent cannot be uniformly determined. In general, when a strong acid such as sulfuric acid, fuming sulfuric acid, chlorosulfuric acid or fluorosulfuric acid is used as a sulfonating agent, the reaction temperature is preferably −10 to 120° C. When other sulfonating agent is used, the reaction temperature is 60 to 200° C. The surface treatment can be completed in most cases when the reaction time is 0.5 to 5 hours.

The milling machine or the dispersing machine that can be used in the present invention can be selected from general milling machines or general dispersing machines. That milling or dispersing machine can be specifically selected from the following machines, while it shall not be limited thereto so long as coagulated particles of the pigment can be finely dispersed. Specific examples of the milling or dispersing machine include machines which finely disperse pigment particles with a shear stress, such as a three-roll mill and a two-roll mill, machines which finely disperse pigment particles with an impact strength caused by the collision between media such as glass beads, zirconia beads or agate balls, such as a ball mill, an atritor, a sand mill, a co-ball mill, a basket mill, a vibration mill, a pearl mill and a paint conditioner, machines which finely disperse pigment particles by causing a shear stress, cavitation, a collision force or a potential core with a rotary blade, such as a disper, a homogenizer and a CLEARMIX (supplied by M Technique K,K), machines which finely disperse pigment particles with a collision force or a shear stress among the pigment particles or between the pigment particles and a vehicle or a wall surface, such as a kneader, an extruder and a jet mill, and an ultrasonic dispersing machine which ultrasonically finely disperses pigment particles. Since the surface treatment in the present invention uses a sulfonating agent, the milling machine or the dispersing machine preferably has acid resistance, and the above media also preferably has acid resistance as required. Further, a general two-roll mill and a general three-roll mil are of an open type, and when such a mill is used, it is necessary to be careful about the control of the reaction temperature, a change caused by the volatilization of a solvent in reaction conditions, the ignition of a solvent and influences of a solvent on human bodies.

Further, when a milling or dispersing machine of a closed type is used, the system is filled with the vapor of a solvent, and it is therefore necessary to be careful about an explosion caused by fire, static electricity in particular, and pressure control.

The surface treatment reaction is generally terminated by decreasing the temperature and adding a proper amount of water. A reaction mixture is poured into a large amount of water, and a surface-treated pigment is separated from a reaction mixture by filtration. However, a finely milled surface-treated pigment cannot be recovered by general filtration. In this case, it can be washed, purified and recovered by means of a centrifugal separation, ultrafiltration, a reverse osmosis membrane or dialysis. Further, after the reaction, a residual sulfonating agent and an ionized compound from a decomposition product can be removed by means of dialysis, an ion exchange resin or an ion exchange membrane.

It is considered that the surface-treated pigment obtained by the process of the present invention has improved affinity with a vehicle and a solvent and exhibits excellent dispersion stability since a reactive functional group on the pigment surface and an aromatic ring react with the sulfonating agent so that sulfonic acid groups or sulfonamide groups bond to the particle surfaces of the pigment. Further, an organic pigment can be uniformly made acidic by bonding sulfonic acid groups to particle surfaces of the pigment. Conventionally, it is required to select a dispersant and a vehicle depending upon a basic pigment or an acidic pigment. In the present invention, the pH value range on the pigment surface can be controlled by the surface treatment, and the dispersant and the vehicle can be structurally unified, so that the preparation of an ink is eased. Further, the functional group introduced to the pigment surface can be used for grafting. Conventionally, the reaction effect reaches only to the surface of each of particles formed by coagulation. In the present invention, however, the organic pigment is surface-treated while coagulated particles of an organic pigment are finely dispersed with a milling machine or a dispersing machine, whereby the reaction effect can be further extended to the surface of finely dispersed particles. As a result, the surface-treated pigment has improved dispersibility in water and an organic solvent. Due to the above effect, as compared with the pigment which is to be surface-treated, the surface-treated pigment is easily dispersible in water and an organic pigment, and is excellent in dispersion stability in a water-based system, so that the surface-treated pigment can be applied to a variety of pigment dispersions.

(Embodiments for inkjet recording liquid)

A solvent, a residual sulfonating agent and a decomposed sulfonating agent are removed from a slurry of the surface-treated pigment. For the removal, washing with water, ultrafiltration, the method of reverse osmosis, centrifugal separation or general filtration are repeated like the above washing and purification.

The surface-treated pigment preferably has an average particle diameter, measured by a laser scattering method, of 10 to 150 nm, more preferably 10 to 100 nm. When the surface-treated pigment having a particle diameter in the above range is used, the filtering is eased when a recording liquid is prepared, and the precipitation of the pigment with time decreases when a recording liquid is stored.

In view of dispersibility, the inkjet recording liquid preferably contains the surface-treated pigment in an amount of 0.1 to 10 parts by weight as a solid content per 100 parts by weight of the inkjet recording liquid.

The surface-treated pigment can be easily prepared into a water-based pigment dispersion by adding the surface-treated pigment to a water-based liquid to form a mixture having a surface-treated pigment concentration of 10 to 40% by weight, and optionally dispersing the mixture by a general dispersing method for a short period of time, without carrying the step of drying the pigment. Since the water-based pigment dispersion is a dispersion of fine particles of the surface-treated pigment which shows excellent dispersibility without adding a dispersing agent, an inkjet recording liquid can be easily obtained by diluting the water-based pigment dispersion to a concentration suitable for printing, adding an additive as required and filtering the mixture. Further, an inkjet recording liquid having higher stability and higher fixing properties can be obtained by dispersing the above dispersion with a dispersing machine in the presence of a dispersant. Moreover, when the above dispersion is further dispersed with a general dispersing machine such as a sand mill, an inkjet recording liquid containing finely milled pigment particles and having a stable dispersion state can be easily obtained for a short period of time without taking a long dispersing time.

The inkjet recording liquid can be produced with any one of a sand mill, a homogenizer, a ball mill, a paint shaker, an ultrasonic dispersing machine and a dispersing machine using a cavitation effect in a high-pressure chamber for dispersing.

Further, the mixing and stirring for the production of the inkjet recording liquid can be effected with a general stirrer or other machine such as a high-speed dispersing machine or an emulsifying machine.

When the inkjet recording liquid of the present invention is produced, the dispersion is preferably fully filtered through a filter having an opening diameter of 3 $\mu$m or less, preferably 1.0 $\mu$m or less, more preferably 0.45 $\mu$m or less.

Pigment particles having large diameters may be removed by centrifugal separation before the above filtering, whereby the clogging of the filter is decreased so that the filter can be used for a longer period of time.

As a water-based liquid, water and optionally a water-based solvent are used. The water includes deionized water from which metal ions, etc., are removed and distilled water. The water content in the recording liquid is preferably 50 to 98% by weight.

The water-based solvent works to stably eject the recording liquid by preventing the drying and solidification of the recording liquid on a nozzle portion and works as a humidifier. The content of the water-based solvent in the recording liquid is preferably 0 to 25% by weight.

The water-based solvent includes ethylene glycol, diethylene glycol, propylene glycol, triethylene glycol, polyethylene glycol, glycerin, tetraethylene glycol, dipropylene glycol, ketone alcohol, diethylene glycol monobutyl ether, ethylene glycol monobutyl ether, ethylene glycol monoethyl ether, 1,2-hexanediol, N-methyl-2-pyrrolidone, substituted pyrrolidone, 2,4,6-hexanetriol, tetraflufuryl alcohol and 4-methoxy-4-methylpentanone. These solvents may be used alone or in combination. For increasing the drying rate of the recording liquid, an alcohol such as methanol, ethanol or isopropyl alcohol may be used.

The inkjet recording liquid of the present invention preferably contains a water-based resin for increasing its fixing property to a receptor sheet. The water-based resin also contributes to the dispersibility of the surface-treated pigment. When the receptor sheet has the property of receiving an ink, no water-based resin is required.

The water-based resin is selected from a water-soluble resin, a water-dispersible emulsion resin and a colloidal dispersion resin, and these resins may be used alone or in combination. Specific examples of the water-based resin include acrylic, styrene-acrylic, polyamide-based, polyurethane-based and fluorine-containing water-soluble and water-dispersible resins.

For increasing the fixing property to a receptor sheet, the recording liquid preferably contains 0.1 to 10% by weight of the water-based resin. When the content of the water-based resin is less than the above lower limit, it is difficult to strongly fix the pigment on a receptor sheet. When the content of the water-based resin exceeds the above upper limit, the viscosity of the recording liquid is excessively high, and the ejection stability may decrease.

A water-soluble resin used as a water-based resin tends to increase the viscosity of the recording liquid, while a water-dispersible resin can decrease the viscosity of the recording liquid or improves the waterfastness of a recorded product.

When the water-based resin is used, preferably, a neutralizing agent such as ammonia, an amine or an inorganic alkali is added to adjust the dissolving of the water-based resin or the stability of the dispersion.

The inkjet recording liquid of the present invention may contain a dispersing agent, an agent for adjusting surface tension and penetration, an antifungal agent, a chelating agent and an antifoaming agent as required.

A dispersant may be used for maintaining the stable dispersion of the pigment, when the water-based cannot be used as a dispersant, or for attaining a further stable dispersion. The dispersing agent can be selected from anionic, nonionic, cationic and amphoteric surfactants.

The anionic surfactant includes fatty acid salt, alkyl sulfate, alkylaryl sulfonate, alkylnaphthalene sulfonate, dialkyl sulfonate, dialkyl sulfosuccinate, alkyl diaryl ether disulfonate, alkyl phosphate, polyoxyethylene alkyl ether sulfate, polyoxyethylene alkylaryl ether sulfate, a naphthalenesulfonic acid formalin condensate, polyoxyethylene alkylphosphate, glycerol borate fatty acid ester, and polyoxyethylene glycerol fatty acid ester.

The nonionic surfactant includes polyoxyethylene alkyl ether, polyoxyethylene alkylaryl ether, a polyoxyethylene oxypropylene block copolymer, sorbitan fatty acid ester, polyoxyethylenesorbitan fatty acid ester, polyoxyethylene-solbitol fatty acid ester, glycerin fatty acid ester, polyoxyethylene fatty acid ester, polyoxyethylenealkylamine, and fluorine-containing and silicon-containing nonionic surfactants.

The cationic surfactant includes alkylamine salt, quaternary ammonium salt, alkylpyridinium salt and alkylimidazolium salt.

The amphoteric surfactant includes alkylbetaine, alkylamine oxide and phosphatidyl choline.

When a receptor sheet for the recording liquid has an osmotic property like paper, a penetrant may be used for promoting the penetration of the recording liquid and promoting the apparent drying properties.

The penetrant includes glycol ethers such as diethylene glycol monobutyl ether, described as a water-based solvent, alkylene glycol, alkylenediol, polyethylene glycol monolauryl ether, sodium laurylsulfate, sodium dodecylbenzenesulfonate, sodium oleate and sodium dioctylsulfosuccinate. The penetrant exhibits a sufficient effect when used in an amount of 5% by weight or less based on the recording liquid. When the amount of the penetrant is greater than the above, undesirably, the penetrant causes a feathering of prints and print-through.

The recording liquid of the present invention may contain an antifungal agent for preventing the occurrence of mold. The antifungal agent includes sodium dehydroacetate, sodium benzoate, sodium pyridinethione-1-oxide, zinc pyridinethione-1-oxide, 1,2-benzisothiazolin-3-one and an amine salt of 1-benzisothiazolin-3-one. The antifungal agent is preferably used in an amount of approximately 0.05 to 1.0% based on the recording liquid.

Further, the chelating agent works to block metal ion in the recording liquid and is added for preventing the deposition of a metal on a nozzle portion and the precipitation of insolubles in the recording liquid. The chelating agent includes ethylenediaminetetracetic acid, sodium salt of ethylenediaminetetraacetic acid, diammonium salt of ethylenediaminetetraacetic acid, and tetraammonium salt of ethylenediaminetetraacetic acid. The amount of the chelating agent based on the recording liquid is preferably 0.005 to 0.5% by weight.

Further, for adjusting the pH of the recording liquid to secure the stability of the recording liquid or the stability of prevention of corrosion of a recording liquid tubing of a recording apparatus, the recording liquid may contain a pH adjuster such as an amine, an inorganic salt or ammonia and a buffer solution such as phosphoric acid.

Further, for preventing the occurrence of foams at the time of ejection of the recording liquid, circulation or movement inside an tubing and production of the recording liquid, an antifoaming agent may be added to the recording liquid.

For adjusting the hue of the pigment and imparting a concentration, a dye may be used in such a manner that there is caused no problem on waterfastness and lightfastness. Some dyes destabilize the dispersion of the pigment, and the amount of the dye based on the pigment is therefore required not to exceed 40% by weight, preferably not to exceed 25% by weight.

The dye includes water-insoluble dyes such as a disperse dye and an oil-soluble dye, insoluble dyes prepared by insolubilizing a direct dye, an acidic dye and a basic dye by chelating, a reactive dye and a metal-containing dye. These dyes are preferably purified dyes from which an inorganic salt is removed.

Specific examples of the dye include C.I. Direct Black 17, 19, 32, 51, 71, 108, 146, 154, 166, C.I. Acid Black 2, 7, 24, 26, 31, 52, 63, 112, 118, C.I. Basic Black 2, C.I. Direct Blue 6, 22, 25, 71, 90, 106, C.I. Acid Blue 9, 22, 40, 59, 93, 102, 104, 113, 117, 120, 167, 229, 234, C.I. Basic Blue 1, 3, 5, 7, 9, 24, 25, 26, 28, 29, C.I. Direct Red 1, 4, 17, 28, 83, C.I. Acid Red 1, 6, 32, 37, 51, 52, 80, 85, 87, 92, 94, 115, 180, 256, 315, 317, C.I. Basic Red 1, 2, 9, 12, 13, 14, 37, C.I. Direct Yellow 12, 24, 26, 28, 98, C.I. Acid Yellow 11, 17, 23, 25, 29, 42, 61, 71, C.I. Basic Yellow 11, 28, C.I. Direct Orange 34, 39, 44, 46, 60, C.I. Direct Violet 47, 48, C.I. Direct Brown 109, C.I. Direct Green 59, C.I. Acid Orange 7, 19, C.I. Acid Violet 49, and C.I. Basic Violet 14, 27.

As other additive, urea and dimethylurea may be added.

Although differing depending upon the method of a recording apparatus, the recording liquid is preferably prepared as a liquid having a viscosity of 0.8 to 15 centipoise (25° C.).

The recording liquid preferably has a surface tension of 25 to 60 dyn/cm. Although not specially limited, the recording liquid has a pH in the range of from 4 to 12, and preferably it is alkaline and has a pH of 7 to 10 in view of the dispersion stability of the surface-treated pigment.

The surface-treated organic pigment of the present invention and the pigment dispersion in the present invention can be widely applied to the fields of a printing ink, a coating composition, a cosmetic, a writing ink, a toner, a liquid developer, an electrophotographic material, recording materials such as an inkjet recording liquid, a colorant for a plastic, an electrodeposition-applied colorant, electronic materials such as a color filter and a photoresist, and pigment printing.

EXAMPLES

The present invention will be explained with reference to Examples hereinafter, while the present invention shall not be limited to these Examples.

<Treatment of organic pigment>

An organic pigment was treated in a mixing ratio (weight ratio) shown in Table 1 under reaction conditions shown in Table 1.

(Treatment 1)

An organic pigment was dispersed in a solvent with a disper under reaction conditions shown in Table 1 and heated up to a predetermined temperature. Then, a sulfonating agent was added and reacted with stirring for a predetermined period of time. After the completion of the reaction, the surface-treated organic pigment was washed with an excess of a solvent a few times, and the washed surface-treated organic pigment was poured into water. The surface-treated organic pigment product was separated from the reaction mixture by filtration, and washed with water.

(Treatment 2)

An organic pigment was finely dispersed in a solvent in a mixing ratio shown in Table 1 with a milling machine or a dispersing machine shown in Table 1. Then, the resultant dispersion was recharged to a reactor, a sulfonating agent was added, and the mixture was heated up to a predetermined temperature with stirring. After the completion of the reaction, the surface-treated organic pigment was washed with an excess of a solvent a few times, and the washed surface-treated organic pigment was poured into water. The surface-treated organic pigment product was separated from the reaction mixture by filtration, and washed with water.

(Treatment 3)

A salt-milled paste of an organic pigment was dispersed in a solvent with a disper under reaction conditions shown in Table 1, and the dispersion of the solvent and the pigment paste was recharged to a reactor which permits degassing under vacuum. While the pressure in the reactor was reduced to 50 Torr or lower with a vacuum pump, the dispersion was heated to 100 to 120° C. to distill off water contained in the solvent, and then a sulfonating agent was added. The mixture was allowed to react at a predetermined temperature for a predetermined period of time. After the completion of the reaction, the surface-treated organic pigment was washed with an excess of a solvent a few times, and the washed surface-treated organic pigment was poured into water. The surface-treated organic pigment product was separated from the reaction mixture by filtration, and washed with water.

TABLE 1

| Example | 1 | 2 | 3 | 4 | 5 | 6 | 7 | 8 | 9 | 10 | 11 | 12 | 13 |
|---|---|---|---|---|---|---|---|---|---|---|---|---|---|
| Organic pigment | | | | | | | | | | | | | |
| 1 | 2 | 2 | 2 | 2 | 2 | 2 | 2 | 2 | | | | | |
| 2 | | | | | | | | | 2 | 2 | 2 | 2 | 2 |
| 3 | | | | | | | | | | | | | |
| 4 | | | | | | | | | | | | | |
| Solvent | | | | | | | | | | | | | |
| 1 | | 100 | | 100 | 70 | | 120 | 140 | | | 150 | | |
| 2 | | | | | | 180 | | | | | | | 160 |

TABLE 1-continued

| | | | | | | | | | | | | |
|---|---|---|---|---|---|---|---|---|---|---|---|---|
| 4 | | | | | | | | 100 | | | | |
| 5 | | | | | | | | | 120 | | | |
| 6 | | | | | | | | | | 150 | | |
| 7 | | 120 | | | | | | | | | | |
| 8 | | | | | | | | | | | | |
| Sulfonating agent | | | | | | | | | | | | |
| 1 | | 2 | | 4 | 2 | | 3 | 3 | | 3 | | 3 |
| 2 | | | | | | 2 | | | 1 | | | 1 | 2 |
| 3 | | | 3 | | | | | | | 4 | | |
| 4 | 1 | | | | | | | | | | | |
| RTemp. °C. | 120 | 150 | 110 | 150 | 100 | 150 | 120 | 150 | 120 | 130 | 100 | 150 | 140 |
| RTime. hr | 3 | 4 | 6 | 5 | 3 | 20 | 3 | 5 | 6 | 5 | 4 | 6 | 26 |
| Treatment | | | | | | | | | | | | | |
| 1 | | ○ | ○ | ○ | | | ○ | ○ | ○ | ○ | | | |
| 2 | | | | | ○ | ○ | | | | | | | ○ |
| 3 | | | | ○ | | | | | | | ○ | ○ | |
| Dispersing | | | | | | | | | | | | | |
| 1 | | | | | ○ | | | | | | | | |
| 2 | | | | | | ○ | | | | | | ○ | |
| 3 | | | | | | | | | | | | | |
| 4 | | | | | | | | | | | | | |

| Example | 14 | 15 | 16 | 17 | 18 | 19 | 20 | 21 | 22 | 23 | 24 | 25 | 26 |
|---|---|---|---|---|---|---|---|---|---|---|---|---|---|
| Organic pigment | | | | | | | | | | | | | |
| 1 | | | | | | | | | | | | | |
| 2 | 2 | 2 | 2 | | | | | | | | | | |
| 3 | | | | 2 | 2 | 2 | 2 | 2 | 2 | | | | |
| 4 | | | | | | | | | | 10 | 2 | 5 | 2 |
| Solvent | | | | | | | | | | | | | |
| 1 | | 120 | 150 | | | | 120 | | | 100 | 120 | | |
| 2 | 120 | | | | | 200 | | | 180 | | | 100 | |
| 3 | | | | | | | | | | | | | |
| 4 | | | | | | | | 180 | | | | | 100 |
| 5 | | | | | | | | | | | | | |
| 6 | | | | | | | | | | | | | |
| 7 | | | | | 200 | | | | | | | | |
| 8 | | | | 140 | | | | | | | | | |
| Sulfonating agent | | | | | | | | | | | | | |
| 1 | 1 | 2.5 | 3 | | | 1 | 1 | | 1.5 | 10 | 15 | | 10 |
| 2 | | | | | | | | | | | | 10 | |
| 3 | | | | 2 | 1 | | | | | | | | |
| 4 | | | | | | | | 2 | | | | | |
| RTemp. °C. | 120 | 100 | 140 | 80 | 110 | 110 | 100 | 150 | 130 | 140 | 120 | 130 | 130 |
| RTime. hr | 6 | 3 | 3 | 3 | 6 | 6 | 6 | 24 | 5 | 4 | 3 | 6 | 3 |
| Treatment | | | | | | | | | | | | | |
| 1 | | ○ | ○ | ○ | ○ | | | | | | ○ | | |
| 2 | ○ | | | | | | ○ | ○ | ○ | ○ | | | ○ |
| 3 | | | | | | ○ | | | | | | ○ | |
| Dispersing machine | | | | | | | | | | | | | |
| 1 | | | | | | ○ | | | | | | | |
| 2 | | | | | | | ○ | | | | | | |
| 3 | | ○ | | | | | | | | | | | |
| 4 | | | | | | | | | | | | | ○ |

RTemp. = Reation Temperature
RTime. = Reaction time
Unit: part by weight

Organic pigment 1: Copper phthalocyanine blue (Lionol Blue FG-7351: supplied by Toyo Ink Manufacturing Co., Ltd.)
Organic pigment 2: Diketopyrrolopyrrole (IRGAZIN DPP Red BO: supplied by Ciba Geigy)
Organic pigment 3: Quinacridone Red (Lionogen Red Y-F: supplied by Toyo Ink Manufacturing Co., Ltd.)
Organic pigment 4: Pigment Yellow 180 (Noveperm Yellow P-HG: supplied by Hoechst)
Solvent 1: Sulfolane
Solvent 2: N-methyl-2-pyrrolidone
Solvent 3: Dimethylacetamide
Solvent 4: Quinoline Solvent 5: Dimethylformamide
Solvent 6: Hexamethylphosphorictriamide
Solvent 7: Pyridine
Solvent 8: Acetonitrile
Sulfonating agent 1: Sulfamic Acid
Sulfonating agent 2: Pyridine Sulfur Trioxide Complex
Sulfonating agent 3: Sulfur trioxide
Sulfonating agent 4: Chlorosulfuric acid
Dispersing machine 1: Three-roll mill (RMZ-1, supplied by K. K. Irie Shokai)
Dispersing machine 2: Ball mill (V-2M, supplied by Irie Shokai)
Dispersing machine 3: Homogenizer (CLEARMIX, supplid by M. TECHNIQUE K. K.)
Dispersing machine 4: Sand mil (Dynomil supplied by Sinmaru Enterprises)

EXAMPLES 1–26

Organic pigments were treated in mixing ratios shown in Table 1 under reaction conditions shown in Table 1 and by treatment methods shown in Table 1.

COMPARATIVE EXAMPLE 1

Copper phthalocyanine (Fast Sky Blue: supplied by Noma Kagaku)

COMPARATIVE EXAMPLES 2–5

Organic pigments 1 to 4 which were not treated.

The surface-treated pigments obtained in Examples 1 to 26 and the pigments in Comparative Examples 1 to 5 were evaluated by the following method.

(Evaluation)

An acryl emulsion was dissolved in water and propylene glycol in the following mixing ratio, and one of the surface-treated pigments in Examples 1 to 26 or the pigments in Comparative Examples 1 to 5 was added. The mixture was dispersed with a paint conditioner in the presence of zirconia beads as media for 3 hours, to obtain a water-based ink.

| | |
|---|---|
| Organic pigment | 8 parts by weight |
| Water-based acrylic resin (JOHNCRYL J-61, supplied by Johnson Polymer Corp.) | 18 parts by weight |
| Dimethylaminoethanol | 1 part by weight |
| Zirconia beads | 25 parts by weight |
| Purified water | 51 parts by weight |

Dispersion stability:

An obtained ink was allowed to stand at 50° C. for 1 month and then inspected for the presence or absence of a precipitate in the ink. The results were expressed by ○, Δ or X. ○ shows the presence of no precipitate, Δ shows the presence of a precipitate to some extent, and X shows the presence of a large amount of a precipitate.

A pigment was measured for a particle size distribution with a laser particle size analyzer (LPA-3000/3100, supplied by Otsuka Electronics Co., Ltd.) to determine an average particle diameter of dispersed pigment particles.

Table 2 shows the results.

TABLE 2

(Results of evaluation of dispersion stability)

| Example | Precipitate | Average particle diameter (nm) |
|---|---|---|
| 1 | ○ | 200 |
| 2 | ○ | 170 |
| 3 | Δ | 230 |
| 4 | ○ | 110 |
| 5 | ○ | 110 |
| 6 | ○ | 120 |
| 7 | ○ | 150 |
| 8 | ○ | 140 |
| 9 | ○ | 170 |
| 10 | Δ | 250 |
| 11 | ○ | 120 |
| 12 | Δ | 320 |
| 13 | ○ | 180 |
| 14 | ○ | 150 |
| 15 | ○ | 180 |
| 16 | ○ | 160 |
| 17 | Δ | 260 |
| 18 | Δ | 240 |
| 19 | ○ | 130 |
| 20 | ○ | 150 |
| 21 | ○ | 160 |
| 22 | ○ | 140 |
| 23 | ○ | 180 |
| 24 | ○ | 120 |
| 25 | ○ | 200 |
| 26 | ○ | 140 |
| CEx. 1 | Dissolved | — |
| 2 | X | 500 |
| 3 | X | 550 |
| 4 | X | 480 |
| 5 | X | 620 |

<Inkjet recording liquid as an example of pigment dispersion>

Examples of the application of the surface-treated pigment to an inkjet recording liquid will be explained below, in which "part" and "%" stand for "part by weight" and "% by weight".

Each of the surface-treated pigments obtained in Examples 4, 5, 7, 8, 11, 14, 15, 16, 20, 22, 23 and 24 under the conditions shown in Table 1 was independently washed with a solvent a few times, poured into water, again washed with water repeatedly and filtered to give water-based dispersions (solid content 15%).

Synthesis Example of water-based resins

Methyl methacrylate (MMA), ethyl acrylate (EA) and methacrylic acid (MAA) were copolymerized in the following monomer ratio (molar ratio) according to the synthesis method of an acrylic resin, to obtain terpolymers.

| Synthesis Example | MMA | EA | MAA | Molecular weight |
|---|---|---|---|---|
| 1 | 1 | 0.5 | 0.5 | 10,000 |
| 2 | 1 | 1.0 | 2.0 | 20,000 |
| 3 | 1 | 2.0 | 1.0 | 20,000 |
| 4 | 1 | 2.0 | 3.0 | 25,000 |
| 5 | 1 | 3.0 | 1.0 | 28,000 |
| 6 | 1 | 3.0 | 0.5 | 18,000 |

APPLICATION EXAMPLES 1–12

A sand mill was charged with raw materials shown in Table 3 in a mixing ratio (weight ratio) shown Table 3, and the mixture was dispersed for 3 to 4 hours. Then, the dispersion was centrifugally separated at 10,000 rpm and filtered through a 0.45 μm filter to obtain an injet recording liquid.

TABLE 3

| Recording liquid | 1 | 2 | 3 | 4 | 5 | 6 | 7 | 8 | 9 | 10 | 11 | 12 |
|---|---|---|---|---|---|---|---|---|---|---|---|---|
| Treated pigment | | | | | | | | | | | | |
| Ex. 4 | 3 | | | | | | | | | | | |
| Ex. 5 | | 3 | | | | | | | | | | |
| Ex. 7 | | | 3 | | | | | | | | | |
| Ex. 8 | | | | 3 | | | | | | | | |
| Ex. 11 | | | | | 3 | | | | | | | |
| Ex. 14 | | | | | | 3 | | | | | | |
| Ex. 15 | | | | | | | 3 | | | | | |
| Ex. 16 | | | | | | | | 3 | | | | |
| Ex. 20 | | | | | | | | | 3 | | | |
| Ex. 22 | | | | | | | | | | 3 | | |
| Ex. 23 | | | | | | | | | | | 3 | |
| Ex. 24 | | | | | | | | | | | | 3 |
| Dispersant | | | | | | | | | | | | |
| 1 | | 1 | | 0.5 | | | 1 | | | 0.5 | | |
| 2 | | | 1 | | 1 | | | 1 | | | | |
| 3 | | | | 0.5 | 1 | | | | | 0.5 | | 1 |
| Resin | | | | | | | | | | | | |
| SE. 1 | | 0.2 | | | | | | | | | | |
| SE. 2 | | | 0.3 | | | | | | | | | |
| SE. 3 | | | | 0.2 | | | | | | | | |
| SE. 4 | | | | | 0.1 | | | | | | | |
| SE. 5 | | | | | | 0.2 | | | | | | 0.1 |
| AR. 1 | | | | | | | 0.2 | | | | | |
| AR. 2 | | | | | | | | | 0.3 | | | |
| AR. 3 | | | | | | | | | | 0.2 | | |
| AR. 4 | | | | | | | | | | | 0.1 | |
| Neutralizing agent | | | | | | | | | | | | |
| 1 | 0.1 | | | | | | 0.1 | | | | | |
| 2 | | 0.1 | | 0.1 | | 0.2 | | 0.1 | | 0.1 | | 0.2 |
| 3 | | | 0.1 | | 0.1 | | | | 0.1 | | 0.1 | |
| Wetting agent | | | | | | | | | | | | |
| 1 | 9 | 10 | 10 | 10 | 10 | | 9 | 10 | 10 | 10 | 10 | |
| 2 | | | | | | 15 | | | | | | 15 |
| Solvent | | | | | | | | | | | | |
| 1 | 1 | | | | | | 1 | | | | | |
| 2 | | 1 | | | | | | 1 | | | | |
| 3 | | | | | 1 | | | | | | 1 | |
| Water DW | 85 | 85 | 85 | 85 | 85 | 80 | 85 | 85 | 85 | 85 | 85 | 80 |
| Antifungal agent | | | | | | | | | | | | |
| 1 | 0.3 | 0.3 | 0.3 | 0.3 | 0.3 | | 0.3 | 0.3 | 0.3 | 0.3 | 0.3 | 0.3 |
| 2 | | | | | | 0.4 | | | | | | |
| Chelating agent EDTA | .03 | .03 | .03 | .03 | .03 | .05 | .03 | .03 | .03 | .03 | .03 | .05 |

SE = Synthesis Example, AR = Acrylic resin,
DW = Deionized water, .03 = 0.03, .05 = 0.05
Unit = part by weight Dispersant 1: Nonionic surfactant "Emulgen 420" supplied by Kao Corp.

Dispersant 2: Nonionic surfactant "Emulgen A-90" supplied by Kao Corp.

Dispersant 3: Nonionic surfactant "Solsperse 27000" supplied by Zeneca K. K.

Acrylic resin 1: Acrylic resin emulsion "W-251" supplied by Nippon Polymer, solid content 40%.

Acrylic resin 2: Acrylic resin emulsion, "Emapoly-TYN-50", supplied by Gifu Shellac, solid content 44%

Acrylic resin 3: Acrylic resin aqueous solution, "JOHNCRYL 62" supplied by Johnson Polymer Corp., solid content 31%

Acrylic resin 4: Acrylic resin aqueous solution, "JOHNCRYL 62J" supplied by Johnson Polymer Corp., solid content 31%

Neutralizing agent 1: Dimethylaminoethanol
Neutralizing agent 2: Diethylaminoethanol
Neutralizing agent 3: Monoethanolamine
Wetting agent 1: Glycerin
Wetting agent 2: Diethylene glycol
Solvent 1: Isopropyl alcohol
Solvent 2: Ethyl alcohol
Solvent 3: N-methyl-2-pyrrolidone Anti-fungal agent 1: "Proxel GXL" supplied by Zeneca K. K.

Anti-fungal agent 2: "Sodium Omadine" supplied by Olin Corp.

Chelating agent: Ethylenediaminetetraacetic acid sodium salt

The recording liquids obtained in Application Examples were evaluated for dispersibility by the following method. Further, the recording liquids obtained in Application Examples were individually placed in cartridges of an inkjet printer (MJ700V2C, supplied by Epson Company and used for recording with the inkjet printer, and recorded products were evaluated for waterfastness, frictionfastness and lightfastness by the following methods. Table 4 shows the results.

Further, the recording liquids obtained in Application Examples were stored at −40° C. for 1 week and self-thawed to show that these recording liquids maintained their initial viscosity and exhibited stable ejection properties. Further, the recording liquids obtained in Application Examples were stored in a constant-temperature chamber at 50° C. for 1 month to show that these recording liquids maintained their initial viscosity and exhibited stable ejection properties. Further, the recording liquids obtained in Application Examples were subjected to a cycle of ×40° C. for 7 hours, room temperature for 7 hours and 50° C. for 7 hours three times to show that these recording liquids maintained their initial printing properties and initial physical property values as recording liquids.

Waterfastness: Printing was made on a copying paper sheet (Zerox 4024), and the copying paper was allowed to stand for 6 hours and then immersed in tap water for 5 minutes. OD values were measured before and after the test, and the water resistance was expressed as a remaining ratio.

Frictionfastness: Set-solid printing was made on an art paper sheet, and a wet swab was rubbed against a record portion three times. Then, the record portion was visually observed for a change.

Lightfastness: Print laminating was made on a coated synthetic paper sheet and exposed with a fadometer for 500 hours. A difference between a color before the test and a color after the test was determined.

Dispersion stability: A recording liquid was stored at 50° C. for 7 days and then it was measured for a change in its particle diameter.

A: Change by less than 15 nm

B: Change by 15 nm or more

TABLE 4

| Recording liquid | Water-fastness | Friction-fastness | Light-fastness ΔE | Dispersibility |
|---|---|---|---|---|
| 1 | 97 | Partly removed | 2.6 | A |
| 2 | 96 | Excellent | 2.4 | A |
| 3 | 98 | Excellent | 2.7 | A |
| 4 | 99 | Excellent | 2.1 | A |
| 5 | 97 | Excellent | 2.6 | A |
| 6 | 97 | Excellent | 2.4 | A |
| 7 | 99 | Partly removed | 2.3 | A |
| 8 | 99 | Excellent | 2.1 | A |
| 9 | 99 | Excellent | 2.1 | A |
| 10 | 97 | Excellent | 2.6 | A |
| 11 | 97 | Excellent | 2.4 | A |
| 12 | 99 | Excellent | 2.5 | A |

An ink, a coating composition, or the like prepared by mixing the surface-treated pigment of the present invention with a vehicle or a solvent has excellent dispersion stability over counterparts containing non-treated pigment, and when it is stored for a long period of time, neither the coagulation nor the precipitation of the surface-treated pigment is observed. The surface-treated pigment of the present invention therefore gives a water-based dispersion having excellent dispersion stability. Further, the surface-treated pigment of the present invention produces an effect which no conventional organic pigments have on electrodeposition and electrophotographic materials by utilizing charges on the pigment surface.

Further, although being an aqueous dispersion type inkjet recording liquid obtained by dispersing a pigment in water-based liquid, the inkjet recording liquid of the present invention is stable in dispersibility and excellent in ejection stability in a nozzle portion. Therefore, the inkjet recording liquid of the present invention can be applied to the fields of preparation of documents in offices, marking on corrugated paper, numbering, barcodes, on-demand printing and fast printing.

What is claimed is:

1. A process for the production of a surface-treated organic pigment, which comprises reacting a sulfonating agent selected from sulfamic acid or pyridine sulfur trioxide complex with an organic pigment dispersed in sulfolane, and thereby introducing sulfonic acid groups to the surface of each particle of the organic pigment.

2. The process according to claim 1, wherein the organic pigment is a product prepared by finely dispersing coagulated particles of the organic pigment with a milling machine or a dispersing machine.

3. The process according to claim 2, wherein the coagulated particles of the organic pigment are finely dispersed by means of a shear stress or an impact force caused by media.

4. The process according to claim 1, wherein the organic pigment is reacted with the sulfonating agent while coagulated particles of the organic pigment are finely dispersed with a milling machine or a dispersing machine.

5. The process according to claim 1, wherein the organic pigment to be dispersed in the solvent is a water-wetted pigment paste obtained without drying the organic pigment after the organic pigment is synthesized.

6. The process according to claim 5, wherein the water-wetted pigment paste dispersed in the solvent is reacted with the sulfonating agent after water is eliminated from the water-wetted pigment paste.

7. The process according to claim 5, wherein the water-wetted pigment paste is a paste of a pigment finely milled by a salt milling treatment.

8. A surface-treated organic pigment produced by the process of claim 6 which substantially has no sulfonic acid group inside each particle thereof and has a sulfonic acid group only on the surface of each particle thereof.

9. A dispersion comprising a surface-treated organic pigment, obtained by dispersing the surface-treated organic pigment recited in claim 8 in a water-based liquid.

10. The dispersion according to claim 9, wherein the surface-treated organic pigment has an average particle diameter, measured by a laser scatter method, of 10 to 150 nm.

11. An ink-jet recording liquid comprising the dispersion of a surface-treated organic pigment recited in claim 9.

12. The ink-jet recording liquid according to claim 11, wherein the inkjet recording liquid contains 0.1 to 10 parts by weight, per 100 parts by weight of the inkjet recording liquid, of the surface-treated organic pigment.

* * * * *